US012800552B2

(12) United States Patent
Balasubramanian et al.

(10) Patent No.: US 12,800,552 B2
(45) Date of Patent: Nov. 17, 2026

(54) SYSTEM AND METHOD FOR REMOTELY MONITORING HEALTH OF A STRUCTURE

(71) Applicant: INDIAN INSTITUTE OF TECHNOLOGY MADRAS (IIT MADRAS), Chennai (IN)

(72) Inventors: Krishnan Balasubramanian, Chennai (IN); Nishanth Raja, Chennai (IN); Muhammad Anas Ansari, Mirzapur (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 334 days.

(21) Appl. No.: 18/554,364

(22) PCT Filed: Apr. 7, 2022

(86) PCT No.: PCT/IN2022/050338
§ 371 (c)(1),
(2) Date: Oct. 6, 2023

(87) PCT Pub. No.: WO2022/215087
PCT Pub. Date: Oct. 13, 2022

(65) Prior Publication Data

US 2024/0219353 A1 Jul. 4, 2024

(30) Foreign Application Priority Data

Apr. 8, 2021 (IN) ............................. 202141016490

(51) Int. Cl.
*G01N 29/24* (2006.01)
*G01N 29/04* (2006.01)

(52) U.S. Cl.
CPC ......... *G01N 29/2462* (2013.01); *G01N 29/04* (2013.01)

(58) Field of Classification Search
CPC .. G01N 29/2462; G01N 29/04; G01N 29/043; G01N 29/07; G01N 2291/044;
(Continued)

(56) References Cited

U.S. PATENT DOCUMENTS 4,590,803 A * 5/1986 Harrold ................ G01N 29/032 73/590
7,246,521 B2 * 7/2007 Kim ........................ G01N 29/07 73/587

(Continued)

OTHER PUBLICATIONS

Ghosh et al., "Waveguide sensing for structural health monitoring at elevated temperatures: simulating corrosion damage reconstruction," Proc. SPIE 10970, Sensors and Smart Structures Technologies for Civil, Mechanical, and Aerospace Systems 2019, 1097009 (Mar. 27, 2019); DOI: 10.1117/12.2514007.

(Continued)

*Primary Examiner* — John E Breene
(74) *Attorney, Agent, or Firm* — Foley & Lardner LLP

(57) ABSTRACT

The present disclosure describes a method and system for remotely monitoring health of a structure (210, 310). The system comprises a processing unit (508), and a plurality of transducers (120) comprising at least one first transducer (120-1) and at least one second transducer (120-2). The system further comprises a plurality of waveguides (130) comprising at least one first waveguide (130-1) whose one end is coupled to the first transducer and other to the structure. The waveguides (130) also comprise at least one second waveguide (130-2) whose one end is coupled to the second transducer and other end to the structure. The first transducer induces one or more guided waves inside the first waveguide that are modified due to interactions with the structure. The modified guided waves are received by the second transducer and one or more signals are generated based on the modified waves, the signals comprise infor- (Continued)

300 mation pertaining to health of the structure. The processing unit analyzes the signals to monitor health of the structure.

16 Claims, 6 Drawing Sheets

(58) Field of Classification Search

CPC ..... G01N 2291/011; G01N 2291/0232; G01N 2291/014; G01N 2291/048; G01N 2291/0258; G01N 29/11; G01N 29/12; G01N 2291/2694; G01N 2291/015; G01M 5/0008; G01M 5/0066; G01M 5/0083

USPC ........................................................... 73/649

See application file for complete search history.

(56) References Cited

U.S. PATENT DOCUMENTS

| | | | | |
|---|---|---|---|---|
| 10,724,994 | B2 | 7/2020 | Van Tooren et al. | |
| 10,794,867 | B2 * | 10/2020 | Chung | G01N 29/48 |
| 10,953,608 | B2 * | 3/2021 | Jahanbin | B29C 66/112 |
| 11,340,195 | B2 * | 5/2022 | Liu et al. | G01N 29/043 |
| 11,460,450 | B2 * | 10/2022 | Druet | G01M 5/0066 |
| 2009/0157358 | A1 * | 6/2009 | Kim | G01M 11/085<br>702/185 |
| 2015/0346161 | A1 * | 12/2015 | Chung | G01N 29/48<br>73/644 |

OTHER PUBLICATIONS

International Search Report for International Application No. PCT/IN2022/050338, dated Jul. 21, 2022, 1 pg.

* cited by examiner 200-1

300

400

500

600

SYSTEM AND METHOD FOR REMOTELY MONITORING HEALTH OF A STRUCTURE

CROSS REFERENCE TO RELATED APPLICATIONS

The present application claims priority under 35 U.S.C. § 371 to International Patent Application No. PCT/IN2022/050338, filed Apr. 7, 2022, which claims priority to and the benefit of Indian Patent Application number 202141016490, filed Apr. 8, 2021. The contents of these applications are hereby incorporated by reference in their entireties.

TECHNICAL FIELD

The present disclosure generally relates to the field of structural health monitoring and non-destructive evaluation. Particularly, the present disclosure relates to a system and method for remotely monitoring health of a structure.

BACKGROUND

Mechanical and civil structures that may include, but not limited to, pipelines, ships, airplane parts, storage tank, missile, metal plates, bridges, building, etc., deteriorate continuously under the influence of operating and ambient environmental conditions. The structural degradation processes may occur in different forms of corrosion, fatigue cracks, accidental damage, strength reduction etc. The extent and severity of these mechanisms depend on the applied static/dynamic loads, environmental conditions, operating conditions, and material properties such as corrosion resistance, microstructural features etc. To ensure safety and reliability of the mechanical and civil structures, continuous inspection and maintenance of the structures is required.

Nowadays, in order to conduct continuous inspection of health of the structures, various structural health monitoring (SHM) techniques have been introduced. The SHM techniques involve monitoring health of the structures using data collected from various sensors and/or transducers installed on the surface of the structures. However, the arrangements adapted to perform these techniques are not effective in certain environments/situations. For e.g., when a structure whose health is to be monitored is placed in a hostile environment (such as hydrocarbon environment, high temperature zone etc.) or in situations where the transducers cannot be directly mounted on the surface of the structure. For example, due to the relatively low Curie temperature of the piezoceramic material lead-zirconate-titanate (PZT), most common PZT transducers cannot be surface mounted on structures operating at high temperatures. Similarly, it is unsafe to mount any sensor on the surface of a voltage sensitive structure (such as military weapons).

Conventionally, there are no techniques available in the market that can remotely monitor the health of the structures placed in the hostile environment in a cost-effective and reliable manner. Hence, there exists a need for the technology that facilitates remote monitoring of the health of a structure in a cost-effective and reliable manner.

The information disclosed in this background section is only for enhancement of understanding of the general background of the invention and should not be taken as an acknowledgement or any form of suggestion that this information forms the prior art already known to a person skilled in the art.

SUMMARY

One or more shortcomings discussed above are overcome, and additional advantages are provided by the present disclosure. Additional features and advantages are realized through the techniques of the present disclosure. Other embodiments and aspects of the disclosure are described in detail herein and are considered a part of the disclosure.

An object of the present disclosure is to provide techniques for remotely monitoring health of a structure in a cost effective and reliable manner.

Another objective of the present disclosure is to simultaneously generate multiple wave modes (guided waves) in a structure without changing the transducer orientation/particle vibration.

Another objective of the present disclosure is to selectively generate wave modes (guided waves) in a structure using a cost-effective and reliable setup.

The above stated objects as well as other objects, features, and advantages of the present disclosure will become clear to those skilled in the art upon review of the following description, the attached drawings, and the appended claims.

According to an aspect of the present disclosure, methods and systems are provided for remotely monitoring health of a structure.

In a non-limiting embodiment of the present disclosure, the present application discloses a system for remotely monitoring health of a structure. The system comprises a plurality of transducers comprising at least one first transducer and at least one second transducer. The system further comprises a plurality of waveguides that comprises at least one 'first' waveguide whose one end is coupled to at least one 'first' transducer. The plurality of waveguides also comprises at least one 'second' waveguide whose one end is coupled to at least one 'second' transducer. The other end of each of the at least one 'first' waveguide and the at least one 'second' waveguide is coupled to the structure. At least one 'first' transducer is configured to induce one or more guided waves inside at least one 'first' waveguide. propagating towards the structure. The, one or more, guided waves are modified due to interaction with the structure and the modified guided waves propagate from the structure towards at least one 'second' transducer through at least one second waveguide. at least one second transducer is configured to receive the modified, one or more, guided waves and generate, signals These one or more signals comprise information pertaining to health of the structure. The system further comprises of at least one processing unit communicatively connected with the plurality of transducers and configured to receive the one or more signals from at least one 'second' transducer and monitor the health of the structure by processing and analyzing the received one or more signals.

In another non-limiting embodiment of the present disclosure, the present application discloses a method for remotely monitoring health of a structure. The method comprises inducing one or more guided waves inside at least one first waveguide. The one or more guided waves propagate through at least one first waveguide towards the structure. The method further comprises receiving the one or more guided waves at the structure and modifying the one or more guided waves due to interaction with the structure. The modified one or more guided waves propagate from the structure towards the at least one second transducer through at least one second waveguide. The method further comprises generating one or more signals based on the modified one or more guided waves received at the at least one second transducer and receiving said one or more signals at a processing unit, the one or more signals comprise information pertaining to health of the structure. The method further comprises monitoring health of the structure by processing and analyzing the received one or more signals.

Particular advantages provided by at least one of the disclosed embodiments include their applicability to structures operating at high temperature and hostile environment, which prevent the surface mounting of conventional transducers. Other advantages of the disclosed embodiments include selective generation of multiple guided wave modes in a structure without changing the orientation/particle vibrations of transducers and effectively sensing these wave modes. The use of multiple wave modes may improve the accuracy of the SHM techniques. The disclosed embodiments provide low cost, reliable, and efficient technique of remotely monitoring health of structures. In one example, the disclosed embodiments may be used for measurement and detection of cracks, notches, defects, and corrosion in the structures placed hostile environments.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Further aspects and advantages of the present disclosure will be readily understood from the following detailed description with reference to the accompanying drawings. Reference numerals have been used to refer to identical or functionally similar elements. The figures together with a detailed description below, are incorporated in and form part of the specification, and serve to further illustrate the embodiments and explain various principles and advantages, in accordance with the present disclosure wherein:

FIG. 2(*b*) illustrates another exemplary SHM system 200-2 for remotely monitoring health of a structure, in accordance with some embodiments of the present disclosure.

DETAILED DESCRIPTION

Figure 1:
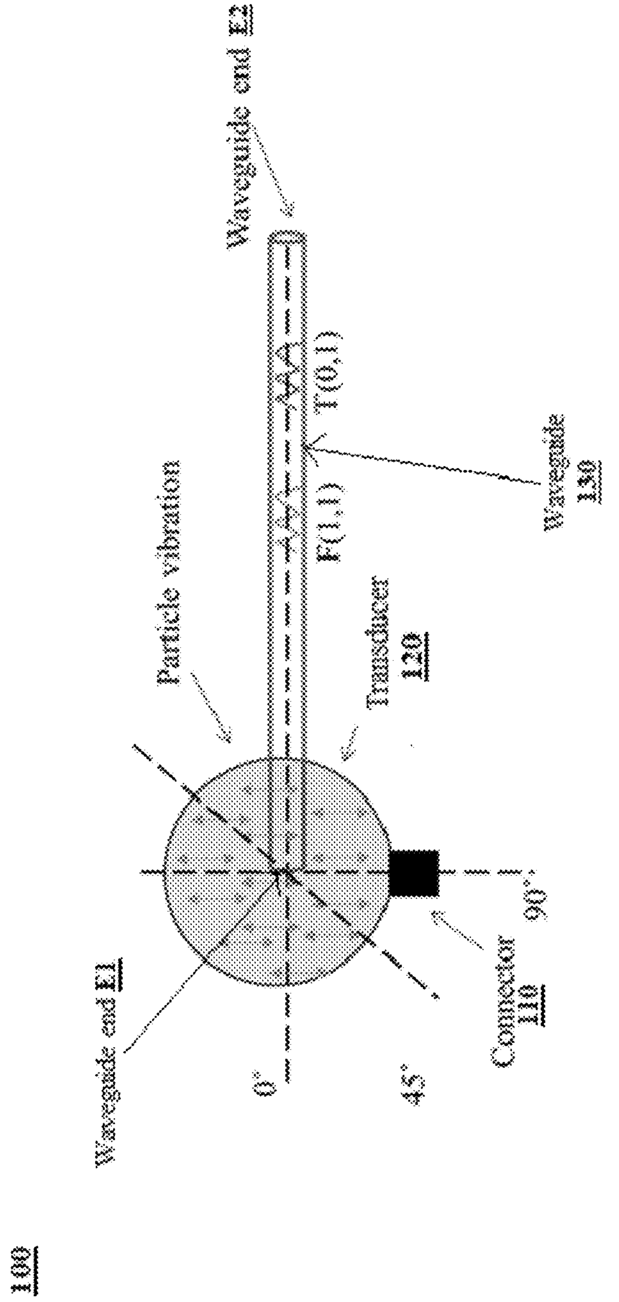
FIG. 1 illustrates an exemplary ultrasonic waveguide sensor 100 for use in remotely monitoring health of a structure, in accordance with some embodiments of the present disclosure.

Referring now to the drawings, there is shown an illustrative embodiment of the disclosure "a method and system for remotely monitoring health of a structure". It is understood that the disclosure is susceptible to various modifications and alternative forms; specific embodiments thereof have been shown by way of example in the drawings and will be described in detail below. It will be appreciated as the description proceeds that the disclosure may be realized in different embodiments.

The terms "comprise(s)", "comprising", "include(s)" or any other variations thereof, are intended to cover a non-exclusive inclusions, such that a setup, device that comprises a list of components that does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus or device.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The terms like "at least one" and "one or more" may be used interchangeably or in combination throughout the description. The terms like "a plurality of" and "multiple" may be used interchangeably or in combination throughout the description. The terms like "a structural health monitoring system" and "system" may be used interchangeably or in combination throughout the description.

The present disclosure provides techniques (methods and systems) for remotely monitoring health of a structure or component. The structure may be placed in a remote location, or in a hostile/hazardous environment (e.g., hydrocarbon environment, high temperature zone etc.), or in an environment where it is difficult to mount sensors on the surface of the structure (e.g., for a voltage sensitive structure, such as missile, it is unsafe to mount any sensor on the surface), or in any other environment.

Ultrasonic guided wave is the commonly used technology for monitoring health of a structure. The structure may be any mechanical or civil structure. Guided waves have a unique ability to confine themselves inside the thin-wall structures, therefore, they can propagate over large distances with minimal attenuation and loss of energy compared to traditional ultrasonic waves. The guided waves have the potential to be used inside curved structures thus suitable for inspection of various shapes and geometries over a longer distance. Furthermore, guided waves provide an efficient and cost-effective means of inspection due to increased inspection speed and penetration power.

Ultrasonic waves are generated primarily by exciting ultrasonic guided wave transducers at a particular frequency and voltage. The ultrasonic guided wave transducers are primarily made from piezoelectric materials. Conventionally, the ultrasonic guided wave transducers are mounted on the surface of the structure and the health of the structure is monitored using data collected from the ultrasonic guided wave sensors. However, as discussed in the background section, these techniques are not effective when the structure or the component-to-be monitored is placed in a hostile environment or in situations/environment where the ultrasonic guided wave sensors cannot be mounted directly on the surface of the component/structure to be monitored. Another challenge faced is that that it is difficult to selectively and remotely produce guided wave modes in a structure for monitoring health of the structure.

To overcome these and other problems, the present disclosure proposes an ultrasonic waveguide sensor to be used as a tool for monitoring health of a structure. FIG. 1 illustrates an ultrasonic waveguide sensor 100 for use in structural health monitoring (SHM). The ultrasonic waveguide sensor 100 comprises a transducer 120 and a waveguide 130. One end E1 of the waveguide 130 may be acoustically coupled with the transducer 120 and the other end E2 of the waveguide 130 may be acoustically coupled with a structure (not shown) whose health is to be monitored. The transducer 120 may be communicatively connected with a computing system (not shown) with the help of a connector 110. When voltage is applied to the transducer 120, its particles get excited and start vibrating. These vibrations may produce ultrasonic guided waves inside the waveguide 130, which is acoustically coupled with the shear transducer 120. Selected wave modes may be generated inside the waveguide 130 by adjusting the orientation of the transducer 120 with respect to the waveguide 130. Ultrasonic waves are generated inside the structure using the ultrasonic waveguide sensor 100 and reflected/refracted waves are received using the same or a different ultrasonic waveguide sensor 100. The data collected from the waves is analyzed for monitoring the health of the structure.

In a non-limiting embodiment of the present disclosure, ultrasonic waveguide sensor 100 may comprise a plurality of waveguides 130 connected to a single transducer 120. The ultrasonic waveguide sensor 100 may act as a transmitter, or receiver, or both. One or more such ultrasonic waveguide sensors 100 may be used for remotely monitoring health of a structure.

Figure 2A:
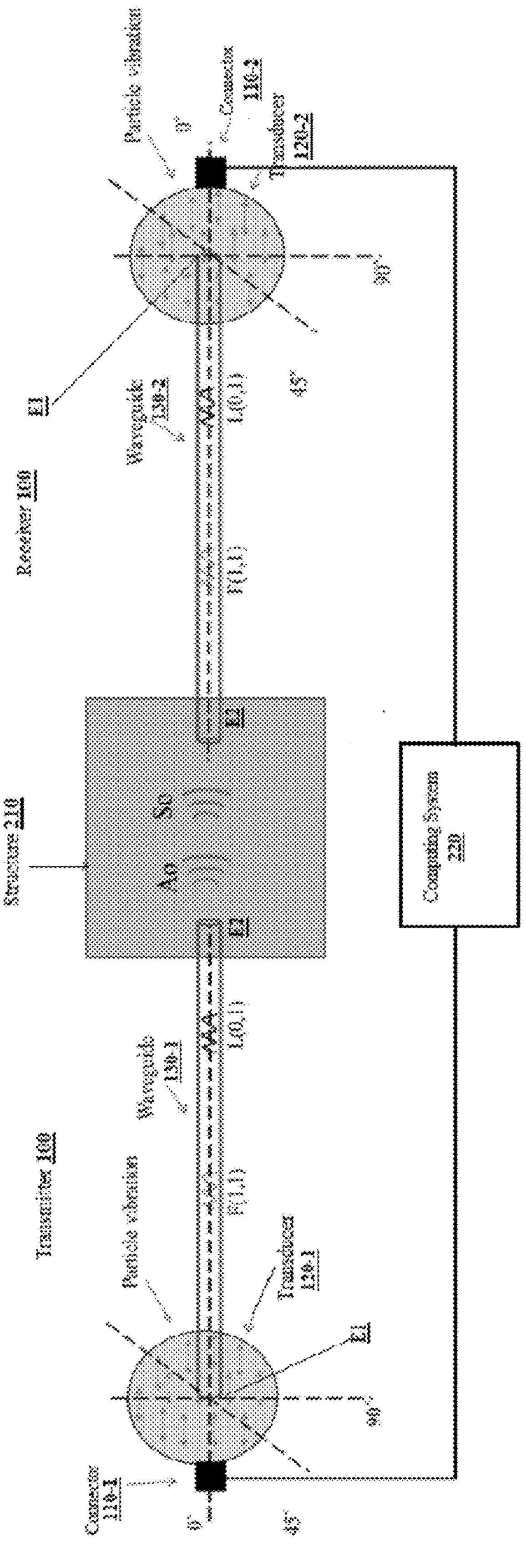
FIG. 2(*a*) illustrates an exemplary structural health monitoring (SHM) system 200-1 for remotely monitoring health of a structure, in accordance with some embodiments of the present disclosure.
Figure 2B:
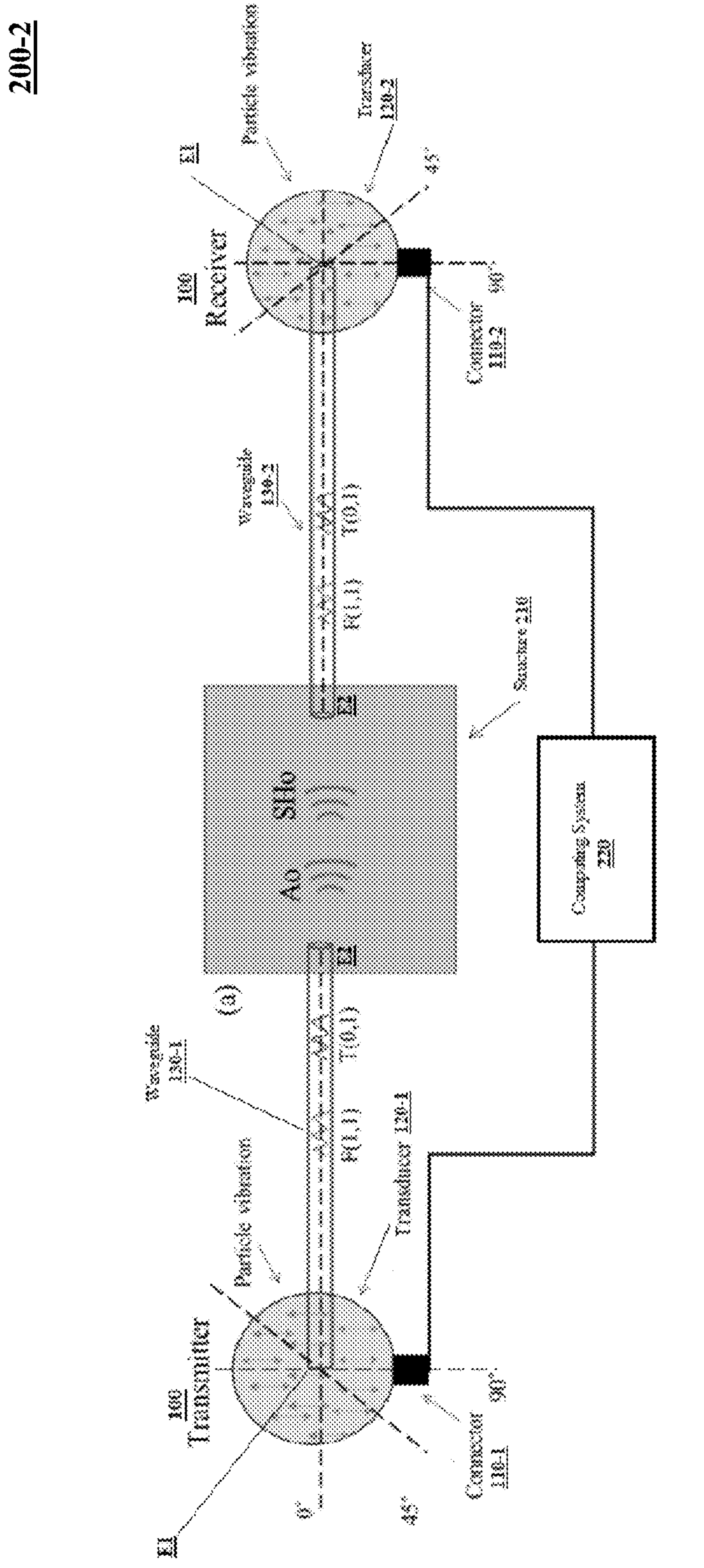

Referring now to FIG. 2(*a*), which illustrates an exemplary structural health monitoring (SHM) system 200-1 for monitoring health of a structure 210 using one or more ultrasonic waveguide sensors 100 in accordance with some embodiments of the present disclosure. The ultrasonic waveguide sensors 100 may act as a transmitter, or receiver, or both depending on the requirement and/or applications.

In one non-limiting embodiment of the present disclosure, the SHM system 200-1 may comprise a structure 210 whose health is to be monitored; a computing system 220; a plurality of waveguides 130-1, 130-2; a plurality of transducers 120-1, 120-2; and a plurality of connectors 110-1, 110-2. It may be worth noting here that the plurality of waveguides may be collectively represented by reference numeral 130, the plurality of transducers may be collectively represented by reference numeral 120, and the plurality of connectors may be collectively represented by reference numeral 110.

The structure 210 may be any mechanical or civil structure. The structure 210 may be of any geometry (shape, size, length, area, volume etc.). For the sake of explanation, the structure 210 shown in FIG. 2(*a*) is assumed as a plate like structure.

The plurality of transducers 120 may comprise at least one first transducer 120-1 forming part of transmitter(s) and at least one second transducers 120-2 forming part of receiver(s). The transducers 120 used herein may be shear transducers. The plurality of transducers 120 may be excited individually and/or simultaneously. In some embodiments, the plurality of transducers 120 may be distributed on the structure 210 at a distance from each other in a random or orderly configuration.

The plurality of transducers 120 may be piezoelectric transducers, shear piezoelectric transducers, electrical magnetic acoustic transducers, or other suitable transducer as may be understood by one of ordinary skill in the art. Each of the plurality of transducers 120 may be a part of a transmitter or a receiver or both. An operating frequency of a transducer 120 may be selected based on a geometry of waveguide(s) (e.g., thickness and a type) coupled with the transducer 120 and further based on a geometry of a structure 210 (e.g., thickness and a type) whose health is to be monitored. In general, a waveguide 130 may be of any type e.g., cylindrical (solid rod, wire, hollow tube, shell), plate, sheet, pipe etc. Similarly, a structure may be of any type e.g., cylindrical, plate, spherical, triangular, or any known shape.

The plurality of waveguides 130-1, 130-2 may comprise at least one first waveguide 130-1 whose one end E1 may be acoustically coupled with at least one first transducer 120-1 and at least one second waveguide 130-2 whose one end E1 may be acoustically coupled to at least one second transducer 120-2. The other end E2 of each of the at least one first waveguide and the at least one second waveguide may be coupled to the structure 210. The plurality of waveguides 130 may be coupled to the structure 210 by welding, brazing, epoxy, high adhesive glue etc. For the sake of explanation, the waveguide 130 shown in FIG. 2(*a*) is assumed as a cylindrical metallic waveguide of circular cross section.

The plurality of connectors 110-1, 110-2 may comprise of at least one first connector 110-1 connected to the at least one first transducer 120-1 and at least one second connector 110-2 connected to the at least one second transducer 120-2. The plurality of connectors 110-1, 110-2 may also be connected to a computing system 220. Thus, the plurality of connectors 110-1, 110-2 may connect the plurality of transducers 120-1, 120-2 with the computing system 220.

Figure 5:
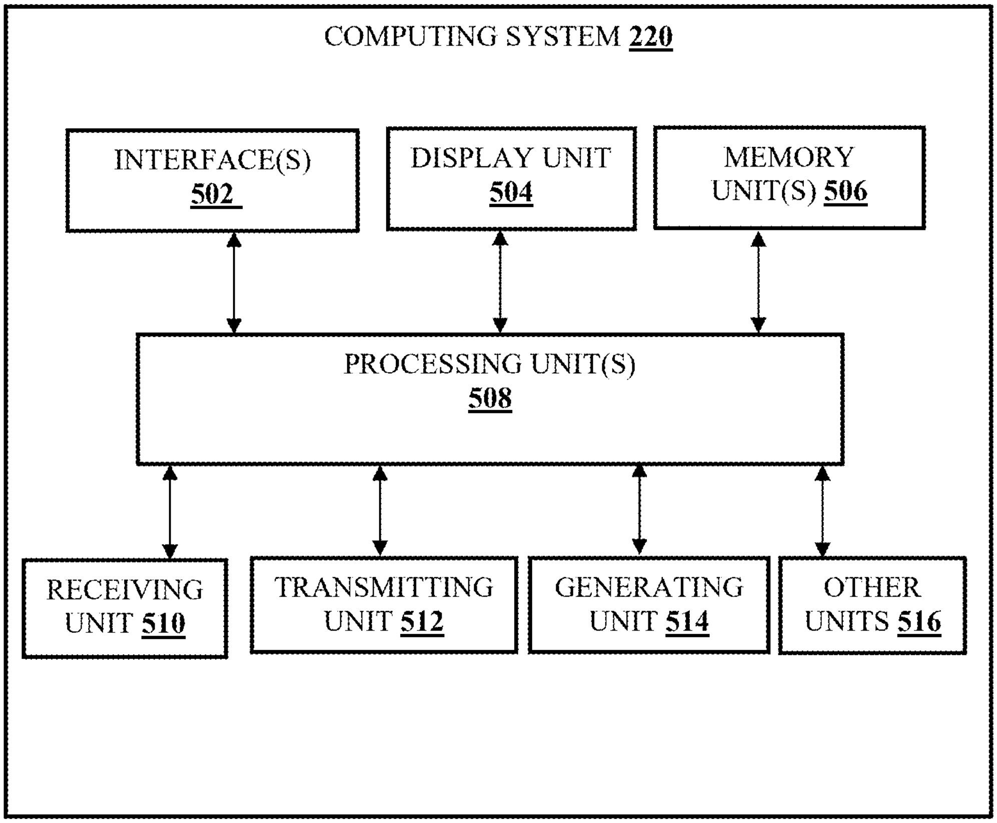
FIG. 5 illustrates an exemplary block diagram 500 of a computing system, in accordance with some embodiments of the present disclosure.

The computing system 220 is illustrated in FIG. 5 in accordance with some embodiments of the present disclosure. According to an embodiment of the present disclosure, the computing system 220 may comprise at least one interface 502, a display unit 504, at least one memory unit 506, at least one processing unit 508, a receiving unit 510, a transmitting unit 512, a generating unit 514, and various other units 516 such as an amplifier, an analog to digital converter etc. The different components of the computing system 220 may be communicatively coupled with each other, over wired or wireless links, either directly or through other components. Further, the computing system 220 may be in communication with the transducers 120 using the interfaces 502 and the connectors 110.

The at least one processing unit 508 may include, but not restricted to, a general-purpose processor, a Field Programmable Gate Array (FPGA), an Application Specific Integrated Circuit (ASIC), a Digital Signal Processor (DSP), microprocessors, microcomputers, micro-controllers, digital signal processors, central processing units, state machines, logic circuitries, and/or any devices that manipulate signals based on operational instructions.

The at least one interface 502 may include a variety of software and hardware interfaces, for example, a web interface, a communication port, a graphical user interface, an input device-output device (I/O) interface, a network interface and the like. The at least one interface 502 may allow exchange of data and/or signals between the computing system 220 and external devices such as, for example, the plurality of transducers 120. Data transferred via the at least one interface 502 may be in the form of signals, which may be electronic, electromagnetic, optical, or other signals.

The at least one memory unit 506 may be configured to store one or more instructions, structural health data of the structure, reference data etc. The at least one memory unit 506 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth.

The generating unit 514 may include a pulse generator to output a plurality of pulses to the plurality of transducers 120. For example, the generating unit 514 may generate time-delayed control signals and/or control signals of varying amplitudes/frequency, which may be transmitted to the plurality of transducers 120 using the transmitting unit 512 for producing particle vibrations in the plurality of transducers 120.

The processing unit 508 may receive, using the receiving unit 510, signals from the plurality of transducers 120. The signals received from the plurality of transducers 120 may include reflections of waves from the structure 210 in response to signals transmitted by the transmitting unit 512.

In one non-limiting embodiment of the present disclosure, the computing system 220 may include an amplifier (not shown) configured to amplify signals received from the plurality of transducers 120. An analog to digital converter (not shown) may be coupled to an output of the amplifier to convert analog signals received from the amplifier to digital signals. The digital signals output from A/D converter may be processed by the processing unit 508 to monitor health of the structure 210 using conventionally known techniques.

Now the process of generating guided waves in the structure 210 is described with the help of FIG. 2(*a*) in accordance with some embodiments of the present disclosure. The computing system 220 may transmit control signals to the at least one first transducer 120-1. The control signals may excite the transducer 120-1 and generate particle vibrations inside the transducer 120-1. Due to the particle vibrations, one or more guided waves may be induced or generated inside the at least one first waveguide 130-1 which is acoustically coupled with the transducer 120-1. The guided waves may be ultrasonic guided waves. The guided waves may be selectively generated inside the waveguide 130-1 based on several factors such as, but not limited to, an orientation of the transducer 120-1 with respect to the waveguide 130-1, an orientation of the waveguide 130-1 with respect to the structure 210, a geometry of the waveguide 130-1, and an operating frequency of the transducer 120-1.

For example, guided waves in cylindrical waveguides/structures may travel in the circumferential or axial direction. The guided waves propagating in the axial direction may involve longitudinal wave/wave mode L(m, n) and torsional waves T(m, n). A longitudinal wave has dominant particle motions in a direction perpendicular to the direction of travel of the wave and a torsional wave has dominant particle motions in the direction of travel of the wave. The longitudinal waves and torsional waves are symmetric waves. According to the energy distribution in the circumferential direction, the guided waves contain axisymmetric waves and non-axisymmetric waves (also known as flexural waves F(m, n)). It may be noted that the integer m denotes the circumferential order of a wave mode and the integer n represents the group order of a wave mode. An axisymmetric wave mode has the circumferential number m=0. Different combinations of the symmetric and asymmetric waves may be generated inside the cylindrical waveguide based on the several factors as described. It may be noted that each wave of the L(m, n), F(m, n), and T(m, n) waves may have different frequency.

The one or more guided waves may propagate through the waveguide 130-1 towards the structure 210 that is acoustically coupled with the waveguide 130-1. The one or more guided waves propagating through the waveguide 130-1 may generate or induce one or more elastic waves inside the structure 210 even with a small area of contact. The one or more elastic waves may be ultrasonic guided waves and may be of the same type as the one or more guided waves or may be of different type depending on geometry of the structure 210; and a geometry of the at least one first waveguide 130-1.

For example, in the illustrative embodiment, the structure is a plate like structure and in a homogeneous isotropic plate like structure the one or more elastic waves may be generally categorized into two classes: Lamb waves and Shear horizontal (SH) waves. The Lamb waves propagate along the plate and can generally be classified into two types: asymmetric Lamb waves (A) and symmetric Lamb waves (S). The asymmetric Lamb waves vibrate out-of-plane (i.e., perpendicular to the surfaces of the plate) and the symmetric Lamb waves vibrate in-plane (i.e., parallel to their propagation direction). The shear horizontal (SH) waves have neither out-of-plane vibrations nor in-plane vibrations but comprise shearing vibrations that are perpendicular to both the surfaces of the plate and the direction in which the waves propagate.

The one or more elastic waves inside the structure 210 may be selectively generated based on one or more factors. For example, the type of wave generated inside the structure 210 depends on a type of material (metal, wood, fiber, glass, plastic etc.) of the structure 210, geometry of the structure 210, and a type of guided waves induced inside the waveguide 130-1. Further, the guided waves inside the waveguide 130-1 may be selectively generated/induced based on the factors as mentioned above.

For example, in the illustrated FIG. 2(*a*), the transducer 120-1 is oriented at an angle of 0 degrees with respect to the waveguide 130-1. Thus, the guided waves generated inside the cylindrical waveguide 130-1 may be identified as longitudinal L(0, 1) and flexural F(1, 1) waves. The guided waves propagate through the cylindrical waveguide 130-1 and may induce or generate fundamental Lamb waves ($A_0$ and $S_0$) inside the plate like structure 210. Thus, guided wave(s) in a one geometry (e.g., cylindrical waveguide) may generate guided wave(s) in a different geometry (e.g., a plate structure).

The one or more elastic waves propagate through the structure 210 before reaching at the at least one second waveguide 130-2 whose one end is acoustically coupled with the structure 210. The one or more elastic waves propagating through the structure 210 may induce or generate a different type of one or more waves inside the waveguide 130-2 depending at least on the type and geometry of the waveguide 130-2. In one embodiment, the type and geometry of the at least one second waveguide 130-2 is same as the type and geometry of the at least one first waveguide 130-1. Thus, the type of guided waves generated inside the at least one second waveguide 130-2 may be same as the type of guided waves propagating through the at least one first waveguide 130-1.

In the illustrated embodiment of FIG. 2(*a*), the elastic waves ($A_0$ and $S_0$) inside the plate like structure 210 may generate the guided waves L(0, 1) and F(1, 1) inside the at least one second waveguide 130-2. However, it may be worth noting here that the properties of the guided waves generated inside the at least one second waveguide 130-2 may differ from the properties of the guided waves propagating through the at least one first waveguide 130-1. The properties may include one or more of, but not limited to, time of flight, amplitude, peak frequency, and amount of fluctuation in amplitude and/or frequency etc. Thus, the original guided waves propagating through the at least one first waveguide 130-1 may get modified due to the interactions with the structure 210.

In one non-limiting embodiment of the present disclosure, the at least one processing unit 508 may analyze the received one or more signals to detect a change in one or more of: a time of arrival, a peak frequency, energy, amplitude, and amount of fluctuation in amplitude and/or frequency of the received signal, and like. The processing unit 508 may detect extent of the damage and location of the damage in the structure 210 based on the result of analyzing using any conventionally known technique.

It may be noted here that a waveguide 130 acts as a filter for different guides waves and selectively generates guides waves inside the structure 210 depending on various factors such as, but not limited to, an orientation of a transducer 120 with respect to the waveguide 130. A relation between the compatibility of a wire waveguide and its response to different sensors as transmitter is shown in Table 1.

TABLE 1

| S. No. | Transmitter | Receiver | Wave mode in waveguide | Wave mode in Plate |
|---|---|---|---|---|
| 1. | Shear PZT @ 0° | Wire Waveguide @ 0° | L(0, 1) & F(1, 1) | So |
| 2. | Shear PZT @ 90° | Wire Waveguide @ 90° | T(0, 1) & F(1, 1) | SHo |
| 3. | Wire Waveguide @ 0° | Wire Waveguide @ 0° | L(0, 1) & F(1, 1) | So and Ao |
| 4. | Wire Waveguide @ 90° | Wire Waveguide @ 90° | T(0, 1) & F(1, 1) | SHo and Ao |
| 5. | Wire Waveguide @ 45° | Wire Waveguide @ 45° | L(0, 1) & T(0, 1) & F(1, 1) | So, SHo, and Ao |
| 6. | FBG @ 0° | Wire Waveguide @ 0° | L(0, 1) & F(1, 1) | So |
| 7. | FBG @ 90° | Wire Waveguide @ 90° | T(0, 1) & F(1, 1) | SHo |

The modified one or more guided waves propagate through the at least one second waveguide 130-2 and produce particle vibrations in the at least one second transducer 120-2, which is acoustically coupled with the at least one second waveguide 130-2. The at least one second transducer 120-2 may receive the modified one or more guided waves using any conventionally known method such as pulse-echo method, pitch-catch method, and through-transmission method. The at least one second transducer 120-2 may generate one or more signals based on the modified one or more guided waves. The one or more signals may comprise information pertaining to health of the structure, which may be transmitted to the computing system 220.

In one non-limiting embodiment of the present disclosure, the processing unit 508 of the computing system 220 may receive the one or more signals from the at least one second transducer 120-2. The signals may include data corresponding to reflections of the one or more guided waves through the structure 210. In an embodiment, an amplifier of the computing system 220 may amplify the received signals and an A/D converter may convert analog signals received from the amplifier into digital signals. The digital signals output from A/D converter may be processed and analyzed by the processing unit 508 to monitor health of the structure 210.

The received one or more signals are the exclusive source of information about health of the structure 210 (i.e., whether the structure 210 is damaged or not, nature and type of damage, location of damage etc.). The received one or more signals may encompass several changes in the characteristics of the one or more guided waves after interaction with the structure 210 and its discontinuities. The at least one processing unit 508 may obtain an error signal by taking the difference between original signal (signal(s) corresponding to the one or more guided waves) and damaged signals (signal(s) corresponding to the modified one or more guided waves).

It may be noted from Table 1 that different orientations of the waveguide 130 may generate different guided waves inside the waveguide 130 and the plate structure 210. It may also be noted that the arrangement of FIG. 2(*a*) corresponds to the configuration (3) of Table 1.

FIG. 2(*b*) illustrates another exemplary structural health monitoring (SHM) system 200-2 for monitoring health of a structure 210, in accordance with some embodiments of the present disclosure. The arrangement shown in FIG. 2(*b*) corresponds to the configuration (4) of Table 1. In the illustrated embodiment of FIG. 2(*b*), asymmetric Lamb wave (Ao) and shear horizontal wave (SHo) may be generated inside the plate like structure 210 by connecting the at least one first transducer 120-1 with the at least one first waveguide 130-1 in such a manner that the angle between the axis of the at least one first waveguide 130-1 and the direction of particle vibration of the at least one first transducer 120-1 is 90 degrees. In this aspect, the guided waves generated inside the at least one first waveguide 120-1 may be identified as F(1,1) and T(0,1), which may induce guided waves Ao and SHo inside the plate like structure 210. It may be noted here that the operations of FIG. 2(*b*) are similar to the operations of FIG. 2(*a*) and the same have not been repeated for the sake of brevity.

In one non-limiting embodiment of the present disclosure, to further improve the accuracy of SHM, all three guided wave modes (Ao, So, and SHo) may be generated inside the plate like structure 210 by keeping the angle between the axis of the at least one first waveguide 130-1 and the direction of particle vibration of the at least one first transducer 120-1 as 45 degrees.

Thus, different experiments may be carried out using different orientations of the waveguides 130 and transducers 120 for accurately identifying any defect in the structure 210.

Figure 3:
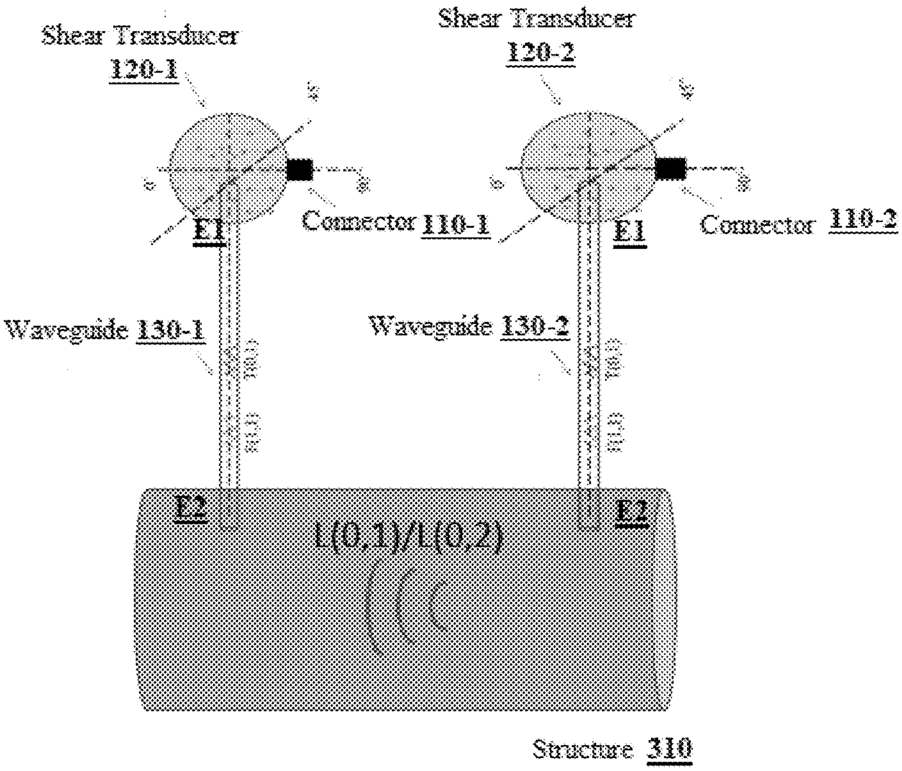
FIG. 3 illustrates yet another exemplary SHM system 300 for remotely monitoring health of a structure, in accordance with some embodiments of the present disclosure.

Referring now FIG. 3, which illustrates another exemplary structural health monitoring (SHM) system 300 for monitoring health of a structure 310, in accordance with some embodiments of the present disclosure. The structure shown in FIG. 3 is a cylindrical structure and the waveguides used are cylindrical waveguides.

In the illustrated embodiment of FIG. 3, longitudinal guided waves L(0, 1) and L(0, 2) may be generated inside the cylindrical structure 310. However, the disclosure is not limited thereto, and any combination of the cylindrical guided waves may be generated inside the cylindrical structure depending on the factors as described above. In the illustrated embodiment, the angle between the axis of waveguide 130-1 130-2 and the direction of particle vibration of the transducer 120-1 120-2 is 90 degrees. In this aspect, the guided waves generated inside the at least one first waveguide 120-1 may be identified as F(1,1) and T(0,1). It may be noted here that the operations of FIG. 3 are similar to the operations of FIGS. 2(*a*)-2(*b*) and the same have not been repeated for the sake of brevity.

It may be understood to a person skilled in art that the present disclosure is not limited to the SHM systems illustrated in FIGS. 2-3 and several variations may be possible depending on a number of waveguides used, geometries of waveguides, orientations of waveguides, geometries of structures etc. For example, it may be understood to a person skilled in art that a waveguide may be of any geometry (i.e., shape, size, cross-section, length, area, dimensions etc.) and any configurations (i.e., bent, spiral, helical etc.) depending on requirement and/or application. Similarly, it may be understood to a person skilled in art that a structure may also have any geometry depending on requirement and/or application.

In the illustrated embodiments of FIGS. 2-3, the orientation of the at least one second waveguide 130-2 with respect to the at least one second transducer 120-2 is as same as the orientation of the at least one first waveguide 130-1 with respect to the at least one first transducer 120-1. However, it may be understood to a person skilled in art that the present disclosure is not limited to this and the orientation of the at least one second waveguide 130-2 with respect to the at least one second transducer 120-2 may be different from the orientation of the at least one first waveguide 130-1 with respect to the at least one first transducer 120-1. Accordingly, the type of guided waves generated inside the at least one first waveguide 130-1 may differ from the type of guided waves generated inside the at least one second waveguide 130-2.

Figure 4:
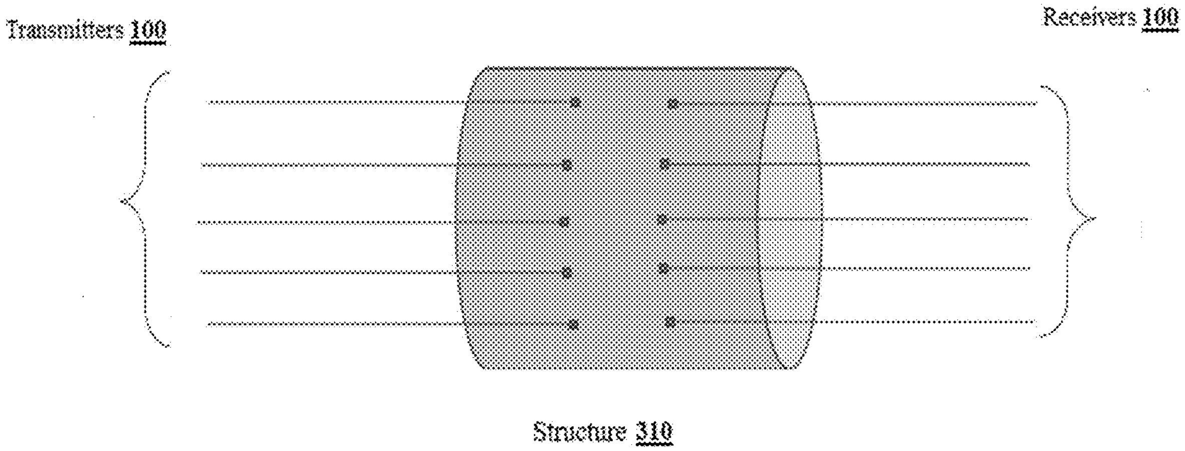
FIG. 4 illustrates yet another exemplary SHM system 400 for remotely monitoring health of a structure, in accordance with some embodiments of the present disclosure.

In the illustrated embodiments of FIGS. 2-3, only one ultrasonic waveguide sensor 100 is shown as a transmitter and only one ultrasonic waveguide sensor 100 is shown as a receiver. However, it may be understood to a person skilled in art that a plurality of ultrasonic waveguide sensors 100 may be used as transmitters and a plurality of ultrasonic waveguide sensors 100 may be used as receivers, as illustrated in FIG. 4. The use of multiple waveguide sensors as transmitters and receivers may improve the accuracy of SHM techniques because guided waves scatter at various angles after interaction with structural defects and this scattering phenomena is proportional to the severity/size of defect. It is difficult to collect most of the dispersed signals by limited number of sensors. Therefore, the use of multiple waveguide sensors in various array configurations improves accuracy of SHM.

In the illustrated embodiments, it is shown that one waveguide is coupled with one transducer. However, the scope of the present disclosure is not limited thereto and in one non-limiting embodiment of the present disclosure, a plurality of waveguides may be acoustically coupled to a single transducer to improve accuracy of SHM.

Further, in the illustrated embodiments, separate waveguides are used for transmitting and receiving guided waves to/from the structure 210. However, in one non-limiting embodiment of the present disclosure, same waveguide(s) may be used for the purpose of transmitting and receiving the guided waves to/from the structure 210.

It may be understood to a person skilled in art that any of the conventionally knows methods such as pulse-echo method, pitch-catch method, and through-transmission method may be used for defect detection depending on the placement of the ultrasonic waveguide sensor(s) 100.

Figure 6:
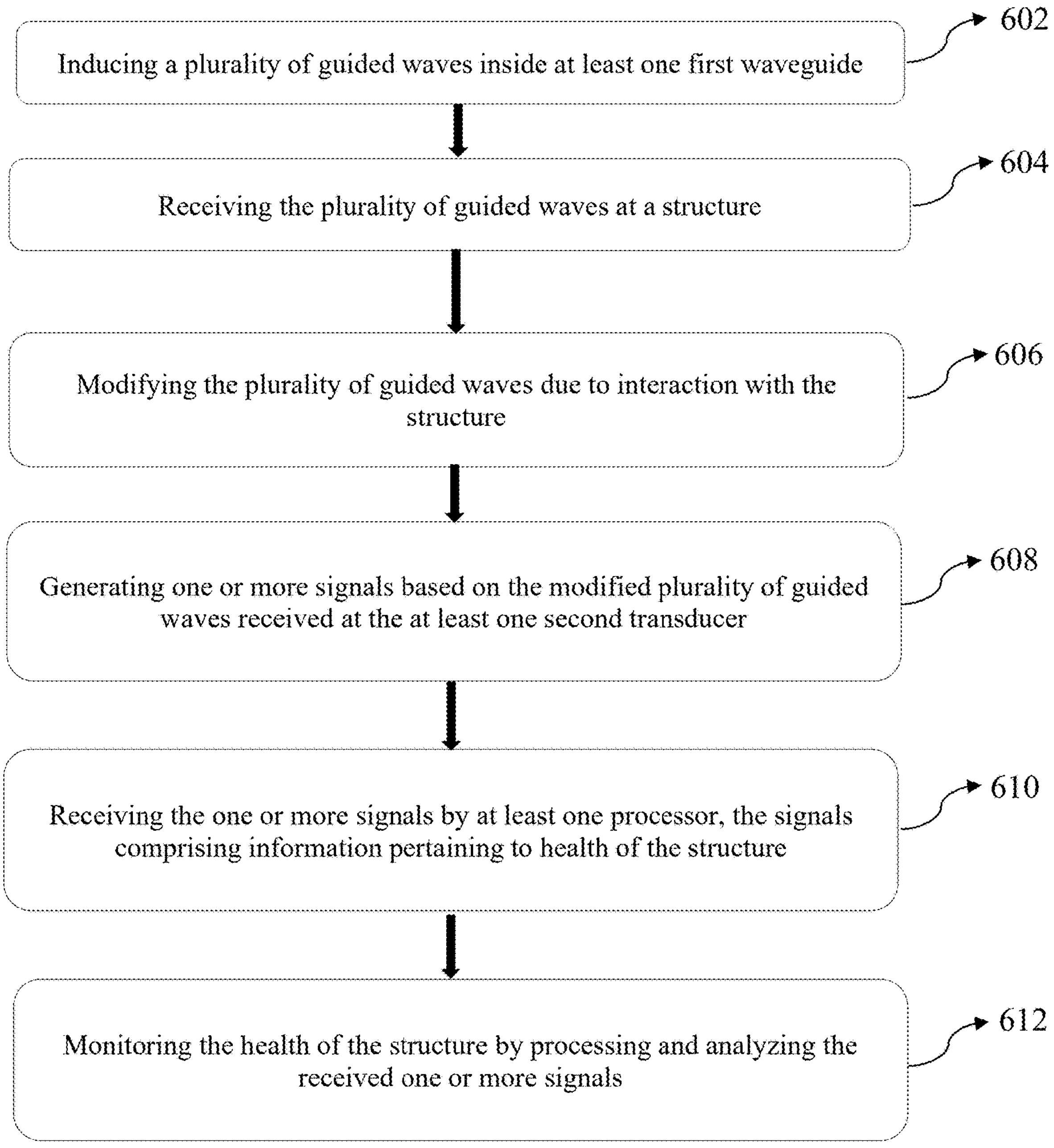
FIG. 6 illustrates a flowchart 600 of an exemplary method for remotely monitoring health of a structure, in accordance with some embodiments of the present disclosure.

FIG. 6 is a flow chart representing exemplary method 600 for remotely monitoring health of a structure 210, 310, according to an embodiment of the present disclosure. The structure may be placed in a hostile environment. The method 600 is merely provided for exemplary purposes, and embodiments are intended to include or otherwise cover any methods or procedures for remotely monitoring health of a structure.

The method 600 may include, at block 602, inducing one or more guided waves inside at least one first waveguide 130-1. The operations of block 504 may be performed by the at least one first transducer 120-1. The induced one or more guided waves may propagate through the at least one first waveguide 130-1 towards the structure 210, 310.

In one non-limiting embodiment of the present disclosure, inducing 602 the one or more guided waves may comprise selectively inducing or generating guided waves inside the at least one first waveguide 130-1 based on one or more of: an orientation of the at least one first transducer 120-1 with respect to the at least one first waveguide 130-1; an orientation of the at least one first waveguide 130-1 with respect to the structure 210, 310; a geometry of the at least one first waveguide 130-1; and an operating frequency of the at least one first transducer 120-1. In one embodiment, an operating frequency of a transducer 120 may be selected based on a geometry of waveguide(s) (e.g., thickness and a type) coupled with the transducer 120 and further based on a geometry of a structure 210, 310 (e.g., thickness and a type) whose health is to be monitored. In general, a waveguide 130 may be of any type e.g., cylindrical (solid rod, wire, hollow tube, shell), plate, sheet, pipe etc. Similarly, a structure may be of any type e.g., cylindrical, plate, spherical, triangular, or any known shape.

At block 604, the method 600 may include receiving the one or more guided waves at the structure 210, 310.

At block 606, the method 600 may include modifying the one or more guided waves due to interaction with the structure 210, 310. The operations of block 504 may be performed by the structure 210, 310. The modified one or more guided waves may propagate from the structure 210, 310 towards the at least one second transducer 120-2 through at least one second waveguide 130-2. The modified one or more guided waves may be received at the at least one second transducer 120-2 using any of: pulse-echo method, pitch-catch method, and through-transmission method.

In one non-limiting embodiment of the present disclosure, the one or more guided waves received at the structure 210, 310 may generate at least one elastic wave in the structure 210, 310, and the at least one elastic wave may get converted into the one or more modified guided waves in the at least one second waveguide 130-2. In one embodiment, a type of the elastic waves generated inside the structure 210, 310 may depend on a geometry of the at least one first waveguide; and a geometry of the structure At block 608, the method 600 may include generating one or more signals based on the modified one or more guided waves received at the at least one second transducer 120-2. The operations of block 504 may be performed by the at least one second transducer 120-2.

At block 610, the method 600 may include receiving the one or more signals by at least one processing unit 508.

At block 612, the method 600 may include monitoring the health of the structure 210, 310 by processing and analyzing the received one or more signals. The operations of block 504 may be performed by the at least one processing unit 508.

In one non-limiting embodiment of the present disclosure, the monitoring 612 the health of the structure 210, 310 may comprise detecting and analyzing a change in one or more of: a time of arrival, a peak frequency, an amplitude, and amount of fluctuation in amplitude and/or frequency of the received one or more signals; and detecting extent of damage and location of damage in the structure 210, 310 based on the result of analyzing.

In one non-limiting embodiment of the present disclosure, the one or more guided waves and the at least one elastic waves may be ultrasonic guided waves. In an embodiment, each of the waveguides 130-1, 130-2 may be a metal waveguide of any geometry.

In one non-limiting embodiment of the present disclosure, the at least one first waveguide 130-1 may be a cylindrical waveguide of circular cross section and the structure 210, 310 may be a metal plate. The one or more guides waves may comprise longitudinal wave mode (L(m,n)), torsional wave mode (T(m,n), and flexural wave mode (F(m,n)) each having different frequency, and the at least one elastic wave may comprise lamb waves (Ao, So) and shear horizontal waves (SHo).

Accordingly, from the above disclosure, it may be worth noting that the present disclosure provides more accurate, easy to implement, convenient, reliable, efficient, and cost-effective techniques of remotely monitoring health of a structure.

The order in which the various operations of the methods are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the disclosure(s)" unless expressly specified otherwise.

The foregoing description of the various embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to limit the embodiments shown herein, and instead the embodiments should be accorded the widest scope consistent with the principles and novel features disclosed herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the appended claims.

The invention claimed is:

1. A system for remotely monitoring health of a structure, comprising:

a plurality of transducers comprising at least one first transducer and at least one second transducer;

a plurality of waveguides comprising:

at least one first waveguide whose one end is coupled to the at least one first transducer; and at least one second waveguide whose one end is coupled to the at least one second transducer, wherein the other end of each of the at least one first waveguide and the at least one second waveguide is coupled to the structure, wherein the at least one first transducer is configured to induce one or more guided waves inside the at least one first waveguide, wherein the one or more guided waves propagate through the at least one first waveguide towards the structure, wherein the one or more guided waves are modified due to interaction with the structure, wherein an operating frequency of the at least one first transducer is selected based on a thickness and a type of the at least one first waveguide and further based on a thickness and a type of the structure, wherein the modified one or more guided waves propagate from the structure towards the at least one second transducer through the at least one second waveguide, and wherein the at least one second transducer is configured to:

receive the modified one or more guided waves, and generate one or more signals based on the modified one or more guided waves, wherein the one or more signals comprise information pertaining to health of the structure; and at least one processing unit communicatively connected with the plurality of transducers, wherein the at least one processing unit is configured to:

receive the one or more signals from the at least one second transducer; and monitor the health of the structure by processing and analyzing the received one or more signals.

2. The system as claimed in claim 1, wherein the one or more guided waves propagating through the at least one first waveguide generate at least one elastic wave in the structure, and wherein the at least one elastic wave gets converted into the one or more modified guided waves in the at least one second waveguide.

3. The system as claimed in claim 1, wherein the one or more guided waves are ultrasonic guided waves, and wherein each waveguide of the plurality of waveguides is a metal waveguide of a geometry.

4. The system as claimed in claim 1, wherein the at least one first transducer is configured to selectively induce guided waves inside the at least one first waveguide based on one or more of:

an orientation of the at least one first transducer with respect to the at least one first waveguide;

an orientation of the at least one first waveguide with respect to the structure; a geometry of the at least one first waveguide; or the operating frequency of the at least one first transducer.

5. The system as claimed in claim 1, wherein the structure is placed in a hostile environment, and wherein a type of the elastic waves generated inside the structure depends on a geometry of the at least one first waveguide and a geometry of the structure.

6. The system as claimed in claim 1, wherein the at least one first waveguide is a cylindrical waveguide of circular cross section and the structure is a metal plate, wherein the one or more guides waves comprise longitudinal wave mode (L(m,n)), torsional wave mode (T(m, n)), and flexural wave mode (F(m,n)) each having different frequency, and wherein the at least one elastic wave comprises lamb waves (Ao, So) and shear horizontal waves (SHo).

7. The system as claimed in claim 1, wherein the at least one processing unit is configured to monitor the health of the structure by:

detecting and analyzing a change in one or more of: a time of arrival, a peak frequency, an amplitude, and amount of fluctuation in amplitude and/or frequency of the received one or more signals; and detecting extent of damage and location of damage in the structure based on the result of analyzing.

8. The system as claimed in claim 1, wherein the at least one second transducer is configured to receive the modified one or more guided waves using any of:

pulse-echo method, pitch-catch method, and through-transmission method.

9. A method for remotely monitoring health of a structure, comprising:

inducing, by at least one first transducer, one or more guided waves inside at least one first waveguide, wherein the one or more guided waves propagate through the at least one first waveguide towards the structure, wherein an operating frequency of the at least one first transducer is selected based on a thickness and a type of the at least one first waveguide and further based on a thickness and a type of the structure;

receiving the one or more guided waves at the structure;

modifying, by the structure, the one or more guided waves due to interaction with the structure, wherein the modified one or more guided waves propagate from the structure towards the at least one second transducer through at least one second waveguide;

generating, by the at least one second transducer, one or more signals based on the modified one or more guided waves received at the at least one second transducer;

receiving, by at least one processing unit, said one or more signals, wherein the one or more signals comprise information pertaining to health of the structure; and monitoring, by the at least one processing unit, the health of the structure by processing and analyzing the received one or more signals.

10. The method as claimed in claim 9, wherein the one or more guided waves received at the structure generates at least one elastic wave in the structure, and wherein the at least one elastic wave gets converted into the one or more modified guided waves in the at least one second waveguide.

11. The method as claimed in claim 9, wherein the one or more guided waves are ultrasonic guided waves, and wherein each waveguide is a metal waveguide of a geometry.

12. The method as claimed in claim 9, wherein inducing the one or more guided waves comprises selectively inducing guided waves inside the at least one first waveguide based on one or more of:

an orientation of the at least one first transducer with respect to the at least one first waveguide;

an orientation of the at least one first waveguide with respect to the structure;

a geometry of the at least one first waveguide; or the operating frequency of the at least one first transducer.

13. The method as claimed in claim 9, wherein the structure is placed in a hostile environment, and wherein a type of the elastic waves generated inside the structure depends on a geometry of the at least one first waveguide and a geometry of the structure.

14. The method as claimed in claim 9, wherein the at least one first waveguide is a cylindrical waveguide of circular cross section and the structure is a metal plate, wherein the one or more guides waves comprise longitudinal wave mode (L(m,n)), torsional wave mode (T(m, n), and flexural wave mode (F(m,n)) each having different frequency, and wherein the at least one elastic wave comprises lamb waves (Ao, So) and shear horizontal waves (SHo).

15. The method as claimed in claim 9, wherein monitoring the health of the structure comprises:

detecting and analyzing a change in one or more of: a time of arrival, a peak frequency, an amplitude, and amount of fluctuation in amplitude and/or frequency of the received one or more signals; and detecting extent of damage and location of damage in the structure based on the result of analyzing.

16. The method as claimed in claim 9, wherein receiving the modified one or more guided waves comprises receiving the modified one or more guided waves using any one of:

pulse-echo method, pitch-catch method, and through-transmission method.

* * * * *